United States Patent
Tolbert et al.

(10) Patent No.: US 6,579,403 B2
(45) Date of Patent: Jun. 17, 2003

(54) TEXTILE PRODUCTS CONSTRUCTED USING CURABLE ADHESIVE THREADLESS SEWING AND PROCESSES FOR PRODUCING SAME

(75) Inventors: Thomas Warren Tolbert, Fort Mill, SC (US); Carmen Lee Waite, Charlotte, NC (US)

(73) Assignee: Springs Industries, Inc., Fort Mill, SC (US)

( * ) Notice: Subject to any disclaimer, the term of this patent is extended or adjusted under 35 U.S.C. 154(b) by 0 days.

(21) Appl. No.: 09/748,638

(22) Filed: Dec. 21, 2000

(65) Prior Publication Data

US 2001/0001300 A1 May 17, 2001

Related U.S. Application Data

(62) Division of application No. 08/705,761, filed on Aug. 30, 1996, now abandoned.

(51) Int. Cl.$^7$ ................................................. B32B 7/14
(52) U.S. Cl. .................. 156/291; 156/390; 156/295; 156/297; 427/377; 427/389.9
(58) Field of Search ................................. 442/149, 150, 442/151; 427/374.4, 372.2, 377, 389.9; 156/88, 227, 295, 297, 291

(56) References Cited

U.S. PATENT DOCUMENTS

| | | | |
|---|---|---|---|
| 3,255,068 A | | 6/1966 | Smith |
| 3,654,015 A | | 4/1972 | Purcell et al. |
| 3,755,033 A | * | 8/1973 | Emus .................... 156/459 |
| 3,775,205 A | | 11/1973 | Hermann et al. |
| 3,867,248 A | | 2/1975 | Bauer |
| 3,905,860 A | * | 9/1975 | Emus .................... 156/459 |
| 3,963,548 A | * | 6/1976 | George et al. ........... 156/227 |
| 4,186,043 A | * | 1/1980 | Zeigler, Jr. et al. ........ 156/202 |
| 4,251,312 A | * | 2/1981 | Ziegler, Jr. et al. ........ 156/465 |
| 4,539,345 A | | 9/1985 | Hansen |
| 4,596,618 A | | 6/1986 | Hammond |
| 4,604,152 A | | 8/1986 | Liukko |
| 4,613,538 A | * | 9/1986 | Wendell et al. ........... 428/195 |
| 4,650,532 A | | 3/1987 | Kloehn et al. |
| 4,670,073 A | | 6/1987 | Langley |
| 4,737,212 A | | 4/1988 | Emrich et al. |
| 4,891,269 A | * | 1/1990 | Markevka et al. ........ 156/307.3 |
| 4,894,277 A | | 1/1990 | Akasaki |
| 5,003,902 A | | 4/1991 | Benstock et al. |
| 5,401,565 A | * | 3/1995 | Vouette .................... 428/343 |
| 5,407,517 A | | 4/1995 | Hansel et al. |
| 5,424,114 A | | 6/1995 | Groshens |
| 5,550,191 A | * | 8/1996 | Hung et al. .............. 525/127 |

OTHER PUBLICATIONS

Ever–Lock trademark information, from USPTO Trademark Text and Image Database.*
"Fully Reactive PU Hot Melts Offer Performance Advantages," by Chambers et al., Adhesive Age, Aug. 1998.*
"Fully Reactive PU Hot Melts Offer Performance Advantages," Adhesive Age, Aug. 1998, pp. 24–27.
Printout from USPTO website for Ever–Lock trademark.

* cited by examiner

Primary Examiner—Cheryl A. Juska
(74) Attorney, Agent, or Firm—Alston & Bird LLP

(57) ABSTRACT

Processes for constructing textile articles using curable hot melt adhesives is disclosed. In the process, a molten curable hot melt adhesive is applied to a fabric surface along a simulated sewing path and contacted to another fabric surface so that the adhesive is disposed between the fabric surfaces. The adhesive bonds the fabric surfaces so that the article can withstand subsequent fabric processing. The adhesive cures over time, causing an irreversible increase in the initial softening point of the adhesive. The resultant textile articles exhibit good seam strengths, durability and desirable aesthetics.

37 Claims, 2 Drawing Sheets

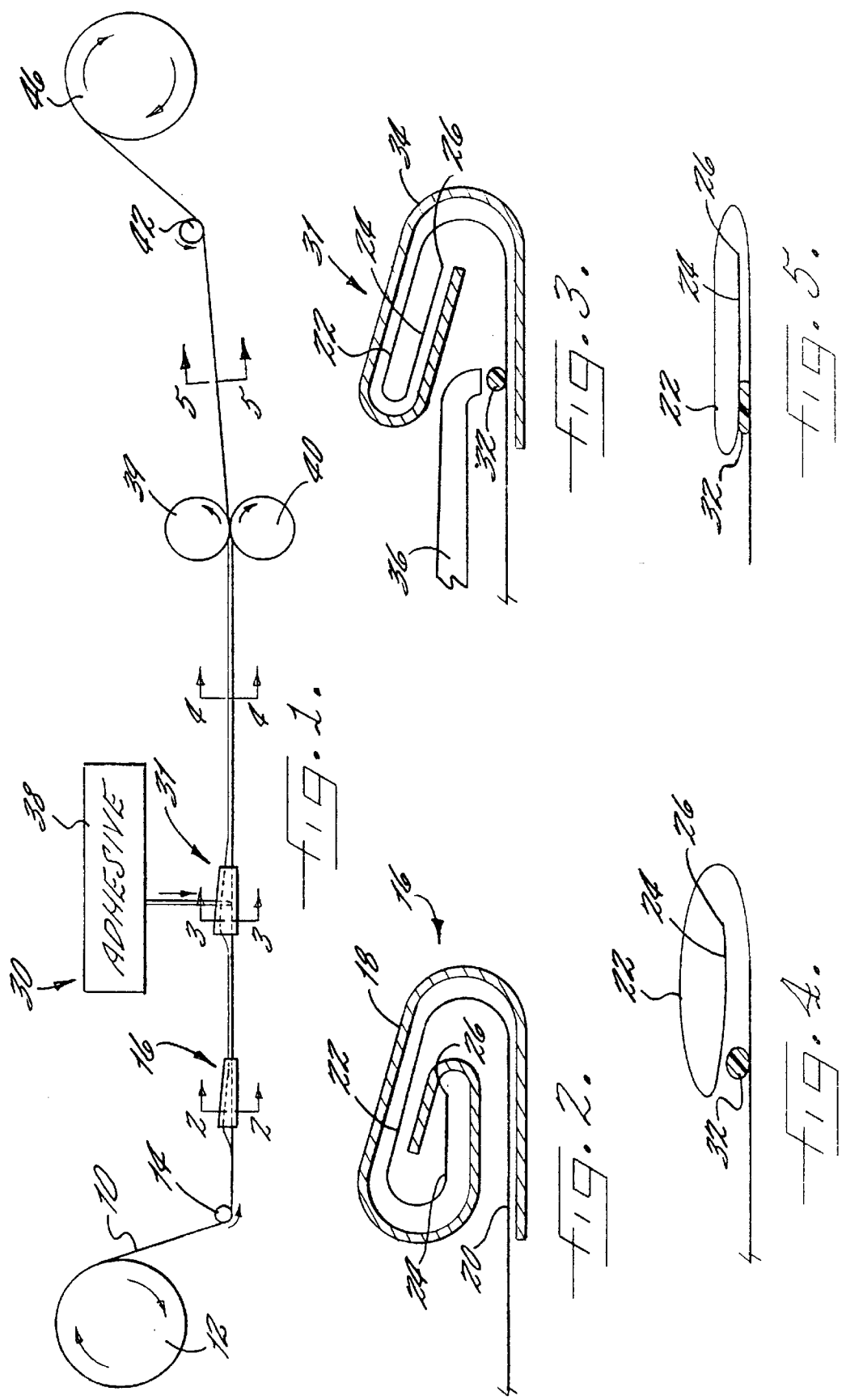

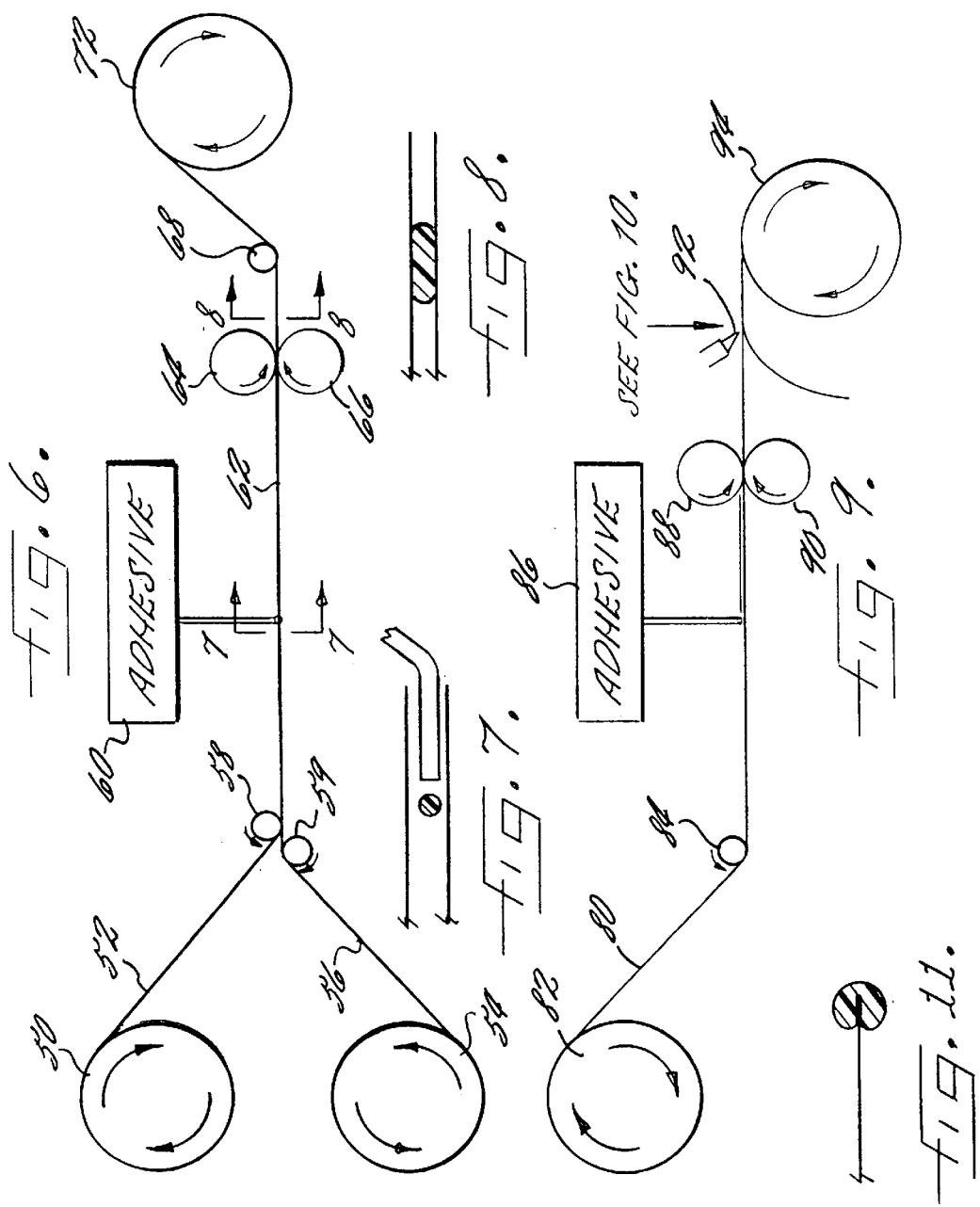

TEXTILE PRODUCTS CONSTRUCTED USING CURABLE ADHESIVE THREADLESS SEWING AND PROCESSES FOR PRODUCING SAME

CROSS-REFERENCE TO RELATED APPLICATIONS

This application is a divisional application of Ser. No. 08/705,761, filed Aug. 30, 1996 now abandoned.

FIELD OF THE INVENTION

The present invention relates generally to textile products, and more particularly to textile products constructed using threadless sewing systems and processes for producing the same.

BACKGROUND OF THE INVENTION

Several factors can limit production speeds of textile products using conventional sewing technology. Currently, one limiting factor is the operation speed of sewing equipment. So called "threadless" or "simulated" sewing operations using various adhesive systems as a substitute for textile thread to join fabric surfaces have been proposed in an attempt to overcome the problems associated with conventional sewing processes.

For example, hot melt adhesives have been proposed as a substitute for sewing thread in various textile manufacturing processes. Hot melt adhesives include thermoplastic materials, such as polyester-, polyvinylacetate-, polyamide- and polyethylene-based resins, which quickly melt upon heating and then return to a solid material to provide an adhesive bond on cooling. When used to construct textile articles, however, conventional hot melt adhesives form bonds that cannot be optimized for aesthetic properties, such as stiffness, rigidity and flexibility; chemical resistance (particularly to chemicals to which bedding, apparel and the like may be exposed during washing, bleaching, dry cleaning, and the like); thermal resistance; discoloration; odor; open time; green strength and ultimate cure strength; manufacturing convenience; and cost.

Hot melt adhesive can be useful in the production of disposable nonwoven products, which typically are used once and then thrown away. However, woven and knit textile products constructed using conventional hot melt adhesives typically may not be durable to withstand multiple launderings, or they may possess undesirable aesthetics.

Crosslinkable or thermosetting adhesives can be applied to textile products for various purposes. These types of adhesive systems, however, also can suffer drawbacks and typically are difficult to use. For example, in the absence of clamps, supports or fixturing devices, the initial bond strength of such adhesives can be insufficient to secure textile substrates to withstand downstream processing until a complete cure is reached several hours after application. Further, thermoset adhesives often have undesirable aesthetic properties such as poor flexibility, brittleness, color and odor.

Defensive publications T926,006 and T926,010 each describe apparatus and methods for seaming a material with a hot melt adhesive which include bringing a ply of sheet material into an overlying, aligned position with another ply, applying hot melt adhesive simultaneously to each of the plies immediately as it is extruded, and then pressing the plies together prior to solidification of these deposits of adhesive. These publications, however, do not recognize nor address the practicalities associated with the properties of hot melt adhesives that are used to form seams in textile fabrics, including poor durability, flexibility, visual aesthetics, extended fixturing, and the like.

U.S. Pat. Nos. 4,251,312 and 4,186,043, each to Ziegler, Jr., et al., describe a method and apparatus for hemming a fabric using a hot melt adhesive. To hem the fabric using hot melt adhesives, the fabric is preheated prior to application of the adhesive. This is stated to overcome the problems associated with the use of hot melt adhesives in textile applications, such as insufficient bond strength to withstand handling and laundering, bleed-through of the adhesive, and the like.

Various other patents disclose the use of "glue" or adhesive filaments to hem or join fabrics. See, for example, U.S. Pat. Nos. 3,654,015 to Purcell, et al.; 3,963,548 to George, et al.; and 4,650,532 to Kloehn, et al. None of these patents, however, recognizes or addresses the problems associated with adhesive processes used to replace conventional sewing thread seaming and joining operations, such as durability of the adhesives, flexibility of cured adhesives, and the like.

SUMMARY OF THE INVENTION

The present invention provides threadless sewing processes for manufacturing textile products in which curable hot melt adhesives replace sewing thread in textile seaming, joining or like sewing operations. The textile products can be produced at increased speeds as compared to conventional sewing thread assembly lines. The resultant textile products are durable (i.e., can withstand multiple launderings without significant loss of strength) but nevertheless can exhibit desirable aesthetics, such as flexibility, drapeability, and softness comparable to textile products formed using conventional sewing processes. Thus, the threadless sewing processes of the invention can be used with numerous fabrics including lighter weight fabrics, such as are often used with sheeting and apparel.

In the invention, a molten, curable hot melt adhesive is applied to a surface of a textile substrate along a simulated sewing path. The curable hot melt adhesive changes its initial thermoplastic properties as a result of a chemical reaction that is initiated during or subsequent to the conditions of simulated sewing causing an irreversible increase in the initial softening point of the adhesive. Preferably, the curing takes place over a period of time, advantageously ranging from one or several hours to several days.

Curable hot melt adhesives include adhesives which react or cure to a substantially fully thermoset state and which cannot be remelted without initiating thermal degradation of the adhesive. Curable hot melt adhesives also include adhesives which upon curing exhibit an irreversible increase in softening point but which still exhibit thermal reversibility between solid and liquid phases without substantial thermal degradation.

Following application of the molten adhesive and prior to curing thereof, pressure is applied along the simulated sewing path to cause the adhesive applied along the sewing path to penetrate into the fibrous structure of the textile fabric and to affect chemical and/or mechanical interaction of the fibers of the textile fabric with the curable hot melt adhesive. In its initially solidified but uncured state, the adhesive forms a threadless seam securing fabric surfaces together at a substantial "green" strength so that the resultant article can be directed to additional downstream processing without supplemental fixturing. Because the bond preferably is not yet fully reacted, the seam can be reopened by heating and the fabric surfaces realigned or "mended" if needed.

The adhesive forming the threadless seam then is subjected to conditions sufficient to react or cure the adhesive to cause an irreversible increase in the initial softening point of the adhesive and to increase the durability and/or strength of the seam. As noted above, the adhesive can cure to an essentially thermoset state or to a state which exhibits an irreversible increase in softening point, but also exhibits thermal reversibility between solid and liquid phases.

Following cure of the adhesive, the resultant seam is capable of withstanding multiple launderings without significant loss of strength. Nevertheless, the seam also can exhibit desirable aesthetic properties, such as drapeability, flexibility, and softness, in contrast to seams formed using sufficient quantities of conventional hot melt or thermoset adhesives for providing a seam of acceptable durability.

The invention is applicable to form numerous different functional and decorative threadless seams. In one aspect of the invention, the curable hot melt adhesive is applied between overlapping layers of a single, folded textile fabric to adhesively secure the layers to provide a threadless seam forming a durable hem. Alternatively, the adhesive can be applied between adjacent surfaces of two or more textile fabrics to construct a durable adhesive seam securing the textile fabrics to one another. The curable hot melt adhesive also can be applied along an edge portion of a textile fabric to provide various other types of threadless seams including a flexible, yet durable, chemical selvage, or an overedge or serge effect (especially for side hems). Still further, a shaped deposit of adhesive can be applied along an edge of a textile fabric to provide decorative threadless seams to replace various conventional decorative effects, such as perling, ribbon-hemming, piping, and other decorative finishes.

In a preferred embodiment of the invention, the adhesive is a moisture curable hot melt adhesive, and more preferably a moisture curable hot melt polyurethane adhesive. This type adhesive is initially thermoplastic but can react with moisture present in the atmosphere as humidity to irreversibly increase the initial softening point of the adhesive.

The present invention also provides textile articles constructed using curable hot melt adhesives applied to a textile article along a simulated sewing path.

BRIEF DESCRIPTION OF THE DRAWINGS

Some of the features and advantages of the invention having been described, others will become apparent from the detailed description which follows, and from the accompanying drawings, in which:

FIG. 1 is a schematic side view of an illustrative apparatus and process for hemming a fabric with a turned or folded hem in accordance with the invention;

FIG. 2 is a cross-sectional view of a folding station taken along line 2—2 of FIG. 1;

FIG. 3 is a cross-sectional view of a curable hot melt adhesive application station taken along line 3—3 of FIG. 1;

FIG. 4 is a cross-sectional view of a hem formed in accordance with the invention just after exiting the adhesive application station taken along line 4—4 of FIG. 1;

FIG. 5 is a cross-sectional view of an adhesively secured hem taken along line 5—5 of FIG. 1;

FIG. 6 is a schematic side view of an illustrative apparatus and process for constructing a longitudinally applied fabric seam in accordance with another embodiment of the invention;

FIG. 7 is a cross-sectional view of a seam formed in accordance with the invention just after exiting an adhesive application station taken along line 7—7 of FIG. 6;

FIG. 8 is a cross-sectional view of an adhesively secured seam taken along line 8—8 of FIG. 6;

FIG. 9 is a schematic side view of an illustrative apparatus and process for forming a chemical selvage or edge effect along a raw edge of a single ply of fabric in accordance with yet another embodiment of the invention;

FIG. 10 is a top view of a downstream portion of the apparatus and process of FIG. 9; and FIG. 11 is a cross-sectional view of an edge effect such as may be formed using the apparatus of FIG. 9.

DETAILED DESCRIPTION OF THE INVENTION

The present invention now will be described more thoroughly hereinafter with reference to the accompanying drawings, in which illustrative embodiments of the invention are shown. This invention may, however, be embodied in many different forms and should not be construed as limited to the embodiments set forth herein. Rather, these embodiments are provided so that the disclosure will be thorough and complete, and will convey fully the scope of the invention to those skilled in the art. Like numbers refer to like elements throughout. For purposes of clarity, the scale has been exaggerated.

FIG. 1 illustrates a schematic side view of an apparatus and process useful for constructing a textile article in accordance with the invention, in particular, an apparatus and process for hemming a fabric. In FIG. 1, a fabric 10 is directed from a supply roll 12 via guide roll 14 to a fabric folding station 16.

Fabric 10 can be a woven, knit, or non-woven fabric and can vary in weight, construction and texture. Exemplary fabric weights range from about 1 ounce per square yard (osy) to about 1 pound per square yard, although lower and higher fabric weights can be used. Fabric thread count and thread size also can vary, including fabrics with thread counts and thread sizes so low as to provide large interstitial voids within the fabric construction to fabrics having a tightly packed fabric construction with no apparent interstitial voids.

The fabrics can include natural fibers such as cotton fibers, wool fibers, silk fibers, asbestos fibers, and the like, which can be mixed with cellulosic-derived fibers, such as wood fibers, for example wood pulp, rayon fibers, and the like. The fabrics also can include synthetic or man-made fibers, such as polyester fibers, acrylic fibers, polyamide fibers such as nylon, polyaramid fibers, polyolefin fibers, such as polyethylene, polypropylene, copolymers of the same, and the like, elastomers, fiberglass, or other synthetic polymers, as well as copolymers and blends of these and other synthetic fibers. The fabrics also can include blends of natural and synthetic fibers.

Although a single guide roll 14 is illustrated in FIG. 1, the skilled artisan will appreciate that additional guide rolls in various arrangements can be provided to assist in the removal of fabric 10 from roll 12 and directing the fabric to folding station 16. Guide rolls can assist in substantially continuous delivery of fabric 10 from roll 12 to folding station 16 and further can assist in straightening the fabric and removing any folds or creases therefrom while also applying substantially uniform tension to the fabric. This can serve to ensure that the longitudinal edge portion or selvage of the fabric is properly straightened and free from folds, while also serving to guide and position the longitudinal edge of the fabric at the proper location for subsequent processing. Such fabric delivery systems are known in the art and are not described in detail herein.

As fabric 10 leaves guide roll 14, the longitudinal edge portion of the fabric is directed through folding station 16 wherein the fabric is folded upon itself one or more times to define a longitudinal hem along the edge portion of the fabric. Folding station 16, as shown in more detail in FIG. 2, includes an elongate folding guide 18 or "trumpet" of known construction, and is preferably made of a metallic sheet material and formed into a convoluted configuration to define an elongate guiding passageway for the advancing fabric. As the fabric passes through folding guide 18, the fabric is guided into the desired folded configuration for the hem. As shown in FIG. 2, a folded hem formed of three fabric layers 20, 22 and 24 is produced by the folding guide 18 with a terminal edge portion or selvage 26 of the fabric being located interiorly of the three fabric layers to hide the raw edge or selvage and present a finished appearance to the hem. However, it will be appreciated that the present invention is also applicable for use with hems of other folded configurations, for example, a folded hem formed of two fabric layers by folding the longitudinal edge of the fabric upon itself once.

Although folding guide 18 is illustrated as having an elongated "trumpet" configuration with a diminishing and flattening spiral cross-section lateral to the direction of fabric progress (a type of passive folding device), other types of folding guides or hemmers can be useful in the present invention, including other passive folding devices. The folding device also can be an "active" fabric folding device or hemmer, which includes various arrangements of belts and/or bars and/or driven wheels, compression brakes, air cylinders, and the like, to provide active guidance and folding for a fabric, all as are well known in the art.

The folded fabric is directed longitudinally to an adhesive application station, designated generally in FIG. 1 as 30. Here a bead of molten curable hot melt adhesive 32 (FIG. 3) is applied along a simulated sewing or stitching path between the front fabric layer 20 and middle fabric layer 24, forming a longitudinal hem. As used herein, and as the skilled artisan will appreciate, the term "simulated sewing path" refers to a generally narrow, continuous, linear or curvilinear path along which a simulated sewing operation, such as seaming, including hemming, serging, overedging, decorative stitching, and the like, is conducted. Although the simulated sewing path is a continuous path, the adhesive can in various embodiments of the invention be applied discontinuously along this path on the fabric surface to provide a continuous simulated sewing effect, i.e., seam, hem or other simulated sewing operation.

Curable hot melt adhesives useful in the present invention are adhesives that are thermoplastic at least initially, but which react, or initiate a reaction during or subsequent to the simulated sewing process, causing an irreversible increase in the initial softening point (the temperature at which the onset of a phase change from solid to liquid begins), and in the melting point of the adhesive. In a currently preferred embodiment of the invention, the curable hot melt adhesive is an adhesive which reacts with moisture present in the atmosphere as humidity following application of the adhesive to a fabric over a period of several minutes to several days.

Generally, it is sufficient that the curing process results in an irreversible increase in the softening and the melting point of the curable hot melt adhesive at least to a temperature greater than the maximum temperature to which the resulting textile article would be exposed during its use-life or to a temperature above the minimum temperature at which the textile fabric component of the textile article undergoes irreversible thermal damage such that the ensemble is no longer suitable for its intended purpose. The adhesive softening point generally increases at least about 10° F., up to about 100° F. or more, preferably at least about 40° F., relative to its initial softening point. Adhesives, however, exhibiting lower or higher irreversible increases in softening point also can be used in the present invention.

The curable hot melt adhesives can react or cure over time via various chemical moieties or additives, including chemical cure initiators or promoters, chemical reaction initiated by exposure to energy (electromagnetic, thermal, electric), or to atmospheric conditions (such as moisture present in the atmosphere), and combinations of these and other reaction mechanisms.

Various curable hot melt adhesives are known and are referred to generally in the art by various designations including thermoplastic/thermoset adhesives, reactive hot melt adhesives, and reactive thermoplastic adhesives. Curable hot melt adhesives include adhesives which react to a substantially fully thermoset state (react or cure irreversibly to form a composition that does not exhibit the thermal reversibility between solid and liquid phases that characterizes conventional hot melt adhesives). Curable hot melt adhesives also include adhesives which upon curing exhibit an irreversible increase in softening point but which are not reacted or cured to such a degree that reversible, thermally induced changes between solid and liquid phases are prevented (i.e., can exhibit thermal reversibility between solid and liquid phases, but at higher temperatures as compared to the unreacted adhesive). Other curable hot melt adhesives useful in accordance with the invention include mixtures or blends of curable hot melt adhesives with conventional hot melt and/or thermoset adhesives, as well as curable hot melt adhesives in varying stages of "cure" (blends or alloys of reacted/nonreacted curable hot melt adhesive).

Curable hot melt adhesives thus initially soften when exposed to heat to allow application of the adhesive to a surface of a textile substrate. The adhesive thereafter sets to form a solid-phase seam upon cooling. Before the reaction or cure is complete, the seam can be reopened by reactivating with heat, for example, to reset or realign an improperly placed hem. After cure is complete, the seam can only be reactivated at a softening temperature which is higher than the initial softening temperature of the adhesive, or cannot be reactivated at all without significant degradation or destruction of the adhesive seam.

Although curable hot melt adhesives react over time to cause an irreversible increase in the initial adhesive softening point and in the durability and/or strength of the adhesive, the cured adhesive seam can nevertheless exhibit desirable aesthetic properties, such as drapeability, flexibility, and softness, unlike seams formed using conventional thermoset adhesives. In contrast, conventional thermoset adhesives typically can be relatively stiff and brittle, and thus are not desirable for use, for example, in some consumer-oriented textile products. In addition, in contrast to conventional thermoset adhesives, curable hot melt adhesives can have exhibit desirable quick tack and green strength. The term "quick tack" refers to the ability of the adhesive to develop an initial tackiness or adhesion upon application of the adhesive to a substrate surface so that surfaces adhered to one another with the adhesive will remain bonded together before the initial liquid-to-solid phase transition has occurred (i.e., during the "open time" during which the adhesive remains in a liquid or softened state) and before the adhesive is fully cured. Quick tack depends in part upon the viscosity of the liquid resin and represents the "pressure sensitive" portion of the life cycle of the adhesive.

The term "green strength" refers to the cohesive strength of the freshly solidified resin (that is, after application to the fabric). It typically is lower than the cohesive strength of the fully cured or reacted adhesive. Green strength is advantageous for maintaining the structural integrity of the joined fabric surfaces until the adhesive can cure.

Advantageously, adhesive set time, i.e., the time it takes for the adhesive to react or cure, is sufficient to allow time to rework the adhesively secured fabric as needed. The adhesive advantageously also has a sufficiently short open time (preferably under 30 seconds) to allow for downstream processing through automated equipment without damage to the integrity of the seam or other simulated sewing operation. Open time refers to the time following extrusion in the molten state and application onto the substrate during which that adhesive can form an adhesive bond, i.e., before the molten adhesive changes phase into its bonding-inaccessible, solid form. This phase change may not be completed simultaneously with the temperature change as the adhesive cools below its initial softening point. Further, after the molten adhesive cools below its initial softening point to its solid phase, the adhesive can exhibit plasticity for a short period of time thereafter. This can give an adhesive a slightly extended open time at ambient temperature in some cases.

It is preferred that the initial melt temperature of the adhesive is relatively low. Relatively high melt temperatures can cause dimensional instability upon contact with a textile substrate. Higher melt temperatures can also necessitate accommodation and/or thermal quenching of the formed seam. For example, conventional hot melt adhesives can have relatively high application temperatures of 300° F. to 550° F., which can require heating the fabric or applying heat to the fabric after adhesive application. This may be necessary to achieve a good bond due to autogenous chilling of the freshly applied adhesive by its primary substrate or contact with air below its effective thermal bonding range before the adhesive contacts the second substrate or surface. This, however, can increase manufacturing costs and the potential for burn injury to machine operators and the potential for fire in the workplace. Preferred application temperatures for curable hot melt adhesive systems useful in the invention range from about 200° F. to about 250° F., although adhesives having higher and/or lower application temperatures can be used.

Curable hot melt adhesive systems useful in the present invention advantageously have a viscosity of about 25,000 centipoise (cP) or less at a temperature in the range of between about 200° F. and about 250° F. using a low-angle cone and plate rheometer such as available from TA Instruments, Inc. Preferably, the viscosity of the adhesive is between about 5,000 and 20,000 cP, and more preferably, about 5,000 cP at the application temperature which is preferably about 250° F. With regard to viscosity, the skilled artisan will appreciate that viscosity can be controlled by various factors, including temperature and chemical compounding, including the addition of fillers. The adhesive should have suitable flow properties to form a strong adhesive bead, provide for application of the adhesive to the fabric surface, and prevent wet out through the fabric, while providing penetration into the fabric structure. This can favor mechanical envelopment by the adhesive of the fibers of the fabrics to which the adhesive is applied.

As noted above, preferred adhesive systems for use in accordance with the invention are moisture-curable hot melt adhesive systems, i.e., adhesive systems that react upon exposure to water or moisture without requiring a discrete or separate cure treatment step. Ambient humidity usually can be adequate to promote cure, although heat and/or high humidity can accelerate curing while low temperatures and/or relatively low humidity (e.g., about 15% relative humidity or less) can retard cure. Further, the presence of water in various textile substrates, such as cotton, can accelerate cure. Also, moisture curable hot melt adhesives are believed to be particularly advantageous for use on cellulosic fabrics or cellulosic blended fabrics. In such cases, it is believed that during the curing process, the adhesive can react with those chemical moieties of textile fibers that provide the same functional reaction as water to increase adhesion between the adhesive and the fabric. Thus, curing of the adhesive can in some cases provide chemical adhesion by reactively integrating the fiber and adhesive with one another, e.g., as may be the case for stearically unhindered hydroxyl groups within cellulosics such as cotton.

Particularly preferred adhesives are moisture curable hot melt polyurethane adhesives, such as those commercially available from Swift Adhesives Division of Reichhold Chemicals, Inc. (Durham, N.C.) under the trade name Ever-Lock 2U302 Aliphatic Polyurethane Adhesive. The Ever-Lock Polyurethane Adhesive can be applied like conventional hot melt adhesive systems and then cycled through multiple thermal quench and reactivate cycles. These adhesives eventually develop their ultimate strength as the adhesive reacts with atmospheric water vapor. Typically, such adhesives are about 75% cured after 4 hours and reach a total cure in 1 to 10 days, depending on the chemical nature of materials in the compounded adhesive.

Although the preferred moisture curable hot melt polyurethane adhesives initially have a relatively low melting point of about 200° F. to 250° F., once cured, the melting temperature of this class of curable hot melt adhesive typically increases up to and above 400° F. The increase in melting point together with an accompanying increase in softening point renders the resultant bond substantially resistant to thermal damage during multiple launderings (for example, at laundering temperatures of at least about 180° F., and up to about 250° F., and higher).

One advantage of the reactivation behavior, i.e., delayed curing behavior, of this class of polyurethane adhesive systems is that the adhesive may be applied at one location within an automated system, thermally quenched, i.e., cooled sufficiently, to remove its tackiness, mechanically conformed into a desired configuration, reactivated, and then sealed to a desired opposing fabric surface. A further advantage of the moisture curable polyurethane adhesive systems is their retained pliability in their cured or reacted chemical state. Still further, moisture curable hot melt polyurethane adhesive systems are substantially resistant to oils, chlorine bleaches, salt solutions, soap solutions, detergent solutions, fuel vapors, and the like, that many consumer products, such as apparel, home textile products, industrial textile products, and institutional textile products routinely contact.

Although moisture curable polyurethane adhesives are currently preferred, the skilled artisan will appreciate that any of the types of curable hot melt adhesive which exhibit the characteristics discussed herein can be applicable with the present invention. For example, chemically catalyzed epoxy adhesives also can be useful in the invention. Other useful curable hot melt adhesives can include "reaction blocking adhesive systems", which generally include "reaction blocking agents" in the presence of otherwise progressively reactive (progressively curing) adhesives. Reaction blocking agents can include, for example, agents incorporating functional moieties that make curing reaction sites in the adhesive unavailable until these agents are removed or deactivated by their reaction with secondary stimuli such as energy fields (e.g. electromagnetic, thermal, electric) or by their spontaneous dissipation over time following application to fabric.

Further, although the present invention has been described with regard to the currently preferred aliphatic moisture curable polyurethanes, aromatic moisture curable polyurethanes can also be useful in various applications. These adhesives can afford enhanced machine running compatibility in the avoidance of gel formation after extended pot life. Aliphatic moisture curable polyurethanes can offer enhanced avoidance of odors inappropriate for home fashions and apparel products that are hermetically sealed after fabrication on automated production equipment. Also, aliphatic moisture curable polyurethane adhesives may demonstrate less yellowing of the adhesive following long term exposure to ultraviolet light (as determined using AATCC 16-1993 "Colorfastness to Light" test method) than do their aromatic analogs.

Referring again to the figures, the folded fabric 10 is directed through a second station 31 having a construction substantially similar to folding station 16, i.e., station 31 includes an elongate guide 34 formed into a convoluted configuration to define an elongate guiding passageway for the advancing fabric.

Station 31 lifts fabric layers 22 and 24 away from fabric layer 20 so that adhesive bead 32 can be applied between the front and middle fabric layers thereof. Although illustrated as separate devices, the skilled artisan will appreciate that stations 16 and 31 can be a single continuous elongate device or a segmented device comprising a progression of multiple steps for the fabric configuration in station 16 to assume the fabric configuration in station 31. Other types of devices capable of facilitating application of an adhesive bead between fabric surfaces also can be used.

Adhesive application station 30 advantageously includes an elongate, tubular adhesive extrusion nozzle 36 extending from a hot melt applicator assembly, generally indicated by the reference character 38. The nozzle 36 has its free end portion extending between the front and middle fabric layers for depositing the bead of molten adhesive 32 therebetween. The wall portion of the convoluted guide represented by 34 may be apertured in a region proximate the region that the bead of adhesive 32 is applied to fabric 10 so that incidental contamination of the apparatus will not cause the system to become unintentionally interrupted. The extrusion nozzle 36 can have a generally right angle bend adjacent the free end thereof so that the free end or tip of the extrusion nozzle 36 is oriented in the downstream direction and this angled nozzle further can be rotated to favor depositing the bead of adhesive 32 directly on the fabric 10 and to preclude contamination of guide 34 by the adhesive.

It will be appreciated from the above discussion that the molten adhesive is applied to the fabric surface in its substantially uncured state and, upon cooling, the adhesive forms an initial bond capable of securing fabric surfaces together. This initial bond can be reactivated thermally until a substantially complete cure is reached.

Molten curable hot melt adhesive from a suitable commercially available hot melt adhesive melting apparatus (not illustrated) is directed to the hot melt applicator assembly 38. The hot melt applicator assembly 38 can be mounted such that it is adapted for being adjustably positioned to permit precise positioning of the tip of the extrusion nozzle 36 at the desired location within the hem. The curable hot melt adhesive can be applied using suitable systems as known in the art, including the series H200 hot melt adhesive applicator gun and the Meltex PUR200 applicators, both of which are commercially available from Nordson Corporation (Norcross, Ga.).

Following application of the molten, uncured adhesive between the overlying fabric layers of the hem, the fabric layers are directed into a nip formed by cooperating pressure rolls 39 and 40. Pressure rolls 39, 40 apply pressure to the hem to cause the bead of molten adhesive 32 to penetrate into the fibrous structure of the fabric layers. As the skilled artisan will appreciate, a discrete portion of the terminus of each seam can be subjected to high pressure in addition to the pressure applied by pressure rolls 39, 40, to provide an area functionally equivalent to rivets, "run-offs" or short extensions of formed thread stitches beyond the edge of the textile assembly, and other techniques conventionally used to prevent raveling of a severed thread.

The distance from adhesive application zone 30 to pressure rolls 39, 40, and the speed of travel of the fabric over this distance, can vary, depending upon the composition of the adhesive (which in turn can affect its viscosity, green strength, melt temperature, etc.) application temperature of the adhesive, the degree of penetration desired, fabric type, fabric weight, and the like. Generally, distance and speed are selected to assure that adhesive bead 32 will remain in the liquid or softened state, i.e., during the open time of the adhesive, to allow pressure rolls 39, 40 to secure the fabric surfaces to one another. This allows the adhesive to form an initial bond of sufficient strength to secure fabric surfaces to one another so that the hem can withstand further downstream processing without shifting or being pulled apart and without fixturing.

For example, moisture curable hot melt polyurethane adhesives described herein can be formulated to have a green strength of at least about 5 pounds, or higher, after traveling about one foot from the adhesive applicator through the pressure nip at a speed of about 170 feet per second. Green strength reported herein is determined by measuring the transverse grab peel tensile force (in pounds) to rupture transversely positioned adhesively bonded seams in a modified conventional "grab tensile" test. Samples are tested using an Instron tester set to a gear ratio sufficient to provide a crosshead speed of 2 inches per minute; a two inch jaw separation; and at least one 1-inch by 1-inch rubber-faced clamp face in each jaw, mated with rubber-faced anvils having at least 1-inch by 1-inch dimensions. Test samples are cut so as to include 4 inches of the simulated seam and 6 inches of laterally disposed flaps of fabric. Other fabric dimensions can be used, so long as there is sufficient fabric in the flaps to extend through the jaws and sufficient simulated seam to extend beyond both sides of both sets of clamping jaws. Opposing portions of two adhesively seamed fabrics, each portion extending from the same side of the adhesive seam with the seam running therebetween, are manually separated and the sample is mounted to orient the adhesive seam with its long or seam dimension transverse to the movement of the jaws and centrally therebetween, so that the test applies force across the seam. The five highest force values in pounds for individual test specimens are average to characterize the rupture strength for a sample that represents a specific set of process parameters. Green strength values outside the preferred values noted above also can be useful.

Advantageously, pressure rolls 39, 40 can be adjusted to vary the amount of pressure exerted on the fabric as it enters the nip defined between rolls 39, 40. Roll pressure can vary depending upon factors such as the weight, thickness, and porosity of the fabric, adhesive composition, viscosity and melt temperature, rate of advancement of the fabric through the nip, and the like. It can be important to exert sufficient pressure to cause the adhesive to penetrate into the fibrous structure of the fabric to obtain a strong mechanical interference bond between the adhesive and the fabric for effectively securing the hem together. However, it also can be important that the pressure is not so great so as to cause the adhesive completely to wet through the fabric so that the adhesive is visible on the exterior surface of the hemmed fabric.

Although a pressure nip formed by cooperating pressure rolls is illustrated in FIG. 1, the skilled artisan will appreciate the other devices known in the art for applying pressure to a fabric surface can also be used, including circumferential wraps of portions of singular or paired, non-pinching rolls.

FIGS. 4 and 5 are cross-sectional views of the hemmed fabric. Specifically, FIG. 4 illustrates the hem substantially immediately after application of the adhesive, and FIG. 5 illustrates the hem just after exiting pressure rolls 39, 40.

The fabric 10 next is directed through guide roll 42 and to takeup roll 46. The adhesively hemmed fabric can remain on roll 46 as illustrated for a time sufficient to allow adhesive bead 32 to cure and to form a durable, yet flexible, seam securing the fabrics surfaces to one another.

Alternatively, the adhesively secured fabric can be directed to additional downstream processing, either before or after the adhesive is substantially cured. Although complete cure may not yet be reached, as discussed herein, the adhesive secures textile surfaces together sufficiently so that the adhesive seam can withstand additional downstream handling. Further, in such embodiments wherein the adhesive has not reached a complete cure, the seam can be opened in the event that the fabric layers are misaligned or the hem is otherwise disturbed, for example, during the subsequent folding and handling of the fabric.

FIG. 1 illustrates forming a single longitudinal hem in a fabric. When a longitudinal hem is desired along the remaining longitudinal edge of the fabric, the fabric may be directed through the apparatus a second time, with the trailing end of the fabric from the first pass through the apparatus serving as the leading end for the second pass. Alternatively, a folding station can be provided for simultaneous or sequential forming of a hem along the second longitudinal edge or selvage of fabric 10 opposite the edge illustrated in FIG. 1.

Turning now to FIG. 6, a schematic side view of an apparatus and process for constructing a fabric in accordance with another embodiment of the invention is illustrated. In this embodiment of the invention, a first supply roll 50 provides a first fabric 52 and a second supply roll 54 provides a second fabric 56. First and second fabrics 52, 56 can comprise similar or dissimilar textile substrates, and also can comprise portions of the same or separate textile substrates. Examples of similar textile substrates include panels of pillow cases, baghouse dust filters, pants legs, skirts, and the like. Significantly dissimilar textile substrates include, for example, a braiding or lace trim attached to a broadcloth panel. Dissimilar textile substrates can also include items such as curtain faces and linings.

Fabric 52 and fabric 56 are directed from rolls 50 and 54, respectively, into opposing face-to-face contact. The fabrics are directed through guide rolls 58, 59 to straighten the fabrics and remove folds and creases therefrom while also applying substantially uniform tension to the fabrics. Rolls 58, 59 also can straighten and align longitudinal edge portions and selvages of the fabrics and guide and position the longitudinal edges of the fabrics at the proper location for subsequent processing. Although FIG. 6 illustrates the fabrics 52 and 56 overlapping completely, the skilled artisan will appreciate that the fabrics can overlap only a portion of each other.

After fabrics 52 and 56 leave rolls 58, 59, the fabrics are directed longitudinally to adhesive application station 60. Adhesive application station 60 can be the same as that described above with reference to FIG. 1. Adhesive application station 60 directs a bead of molten curable hot melt adhesive along a simulated sewing path between the mated fabric surfaces of fabric layers 52 and 56 to form an adhesive seam. FIG. 7 is a cross-sectional view taken along line 7—7 of FIG. 6 and illustrates the adhesive bead as applied between fabric layers 52 and 56.

After exiting adhesive application station 60, the fabric structure, designed generally as 62, passes a predetermined distance to a pressure nip formed, for example, by cooperating pressure rolls 64 and 66. Thereafter, fabric article 62 can be directed by guide roll 68 and stored on takeup roll 72, as illustrated, or alternatively to additional downstream processing. FIG. 8 is a cross-sectional view taken along line 8—8 of FIG. 6 and illustrates the adhesive seam just after exiting pressure rolls 64, 66. Thus, the present invention not only provides a process for securing a hem of a single fabric using a curable hot melt adhesive, but also for securing multiple fabric pieces together.

If desired, the fabric layers 52 and 56 can be spread apart or "opened" by 180° so that the result approximates the configuration of a "french hem." Alternatively, if the two fabrics 52 and 56 that comprise the assembly are spread apart or opened by 360°, the result is a "reversed" seam.

Still further, as illustrated in FIG. 9, the present invention also includes processes using curable hot melt adhesives to provide a finished appearance to a raw edge or selvage of a fabric. Turning now to FIG. 9, a schematic side view of an apparatus and process for forming a chemical selvage in accordance with this aspect of the invention is illustrated. Fabric 80 is directed from supply roll 82 by guide roll 84 and to adhesive application system 86. Here, molten curable hot melt adhesive is applied to a fabric surface along a simulated sewing path parallel to a raw edge or selvage thereof. Thereafter, the fabric is directed through a nip formed by cooperating pressure rolls 88 and 90 to cause the molten adhesive to penetrate into the fibrous structure of the fabric layer. If desired, the fabric 80 can be directed to a fabric slitting apparatus 92, best illustrated in FIG. 10, to cut or remove any unfinished longitudinal edge portions of the fabric. The resultant finished fabric is thereafter directed to takeup roll 94, as illustrated, or alternatively to additional downstream processing.

This aspect of the invention can provide several advantages as compared to conventional techniques for finishing a raw edge of a fabric. For example, this can eliminate the need to change a weave or knit pattern along a raw edge of the fabric to prevent raveling of discrete threads, or to tuck or sew a hem to prevent raveling and/or hide the raw edge. In addition, the curable adhesives of the invention provide improved aesthetics as compared to conventional adhesive treatments of woven and/or knit fabric edges. Despite the dimensional stabilization of the fabric construction that is provided by the chemical selvage of the invention, the fabric edges exhibit flexibility. Still further, the chemical selvage is chemically resistant and durable, i.e., is capable of withstanding multiple launderings without substantial degradation or loss of the adhesive selvage.

This aspect of the invention also is advantageous for creating a feedstock for a ruffling or similar article useful for making dust ruffles, curtains and the like. For example, a chemical selvage as described above can be applied to one or both surfaces of a fabric (or flushed through the body of the fabric such that a singular application to one fabric surface would result in having reactivatable adhesive exposed on both surfaces of the fabric along the simulated sewing path), the fabric configured as desired (for example by pleating), and the adhesive allowed to cure to set the desired fabric configuration. This process can be advantageous over traditional thread sewing, eliminating the problems associated with loose thread loops, matching thread and fabric color, incompatibility of needle sewing with variable density feedstock, and the like. For lightweight fabrics (such as laces, open weave fabrics, etc.), this can minimize or eliminate damage to the textile components by the sewing machine. For medium weight fabrics (slit printed sheeting, embroidered laces, etc.) this can assure exact positioning and securing of the folds. For heavy weight fabrics (grosgrain, cockades, rosettes, etc.), this can avoid damage to sewing machines by the textile components.

Although FIGS. 1, 6, and 9 illustrate roll-to-roll process configurations, one skilled in the art of fabric handling will readily appreciate that the present invention can also be useful with roll-to-sheet and sheet-to-sheet processes.

The present invention also includes processes for producing decorative features for textile products, for example, profile extrusion of curable hot melt adhesives along an edge portion of a textile substrate as illustrated in FIG. 11. FIG. 11 illustrates a shaped deposit of adhesive at the extreme edge of a textile substrate, which can replace various conventional decorative effects, such as perling, ribbon-hemming, piping, and other decorative finishes.

The invention described above is subject to numerous variations as will be apparent to the skilled artisan. For example, although the present invention has been described in terms of applying a continuous bead of molten adhesive to a fabric surface, the adhesive also may be applied as a discontinuous bead or pattern, so long as the adhesive follows a simulated sewing path. Advantageously for selvage applications, the adhesive is applied to a fabric surface using a slot applicator to provide a strip of adhesive thereon. The adhesive also can be applied by spraying, for example, spin-spraying, a process in which filament-like adhesive issuing from an application nozzle is placed into a spiral motion by controlled twirling preferably using compressed air. Adhesive also can be applied to a fabric surface by converting molten adhesive into droplets or fibers or continuous filaments in mid-air by metering, sputtering, melt blowing, and/or spunbonding nozzles or intermediary devices. Adhesive also can be applied to fabric surface using various coating and printing techniques, including gravure rolls.

In addition, although the invention has been described herein as being directed to the use of curable hot melt adhesives for constructing seams, hems, selvages and decorative edge affects for fabrics, the curable hot melt adhesives are also useful for forming decorative patterns on a fabric surface and for attaching beading, braiding, and the like to a fabric surface, creating a quilted effect across a surface of the fabric, and the like.

The textile articles thus constructed include consumer, institutional, and industrial textile articles. These articles can exhibit durability (i.e., can withstand multiple launderings without significant loss of strength) and have desirable aesthetics, such as flexibility, drapeability, and softness. Exemplary textile articles include bedding products, such as sheets, blankets, comforters, pillow cases, bedspreads, quilts, pillowshams, dust ruffles and the like; window treatments; including lined and unlined curtains; towels; floor coverings such as bath mats; shower curtains; napery, such as tablecloths, napkins, place mats, and the like; and wearing apparel, including chemical decontamination suits, military and ballistics devices and consumer garments comprising polyester and other fabric fibers that experience early seam failure due to internal abrasion of sewn seams. Further, the curable hot melt adhesive systems used in accordance with the present invention can prevent fabrics from tearing and raveling, and replacing conventional tucked or sewn selvages.

The textile articles constructed according to the invention generally have adhesive seams which exhibit excellent transverse grab peel tensile strengths before and after cure, as compared to seams constructed using conventional hot melt adhesives. For example, the seams of the articles of the invention can have transverse grab peel tensile strengths from about 15 pounds to about 35 pounds, and up to about 45 pounds, and higher, determined using the modified grab tensile test described above. The skilled artisan will appreciate, however, that acceptable transverse grab peel tensile strength of the adhesive seams can vary depending on the end use of the textile article.

Further, advantageously the adhesive seams maintain tensile strength properties after multiple launderings, i.e., after multiple exposure to high temperatures and/or chemical environment of home and/or commercial laundering equipment. For example, seams of textile articles of the invention can exhibit a loss in tensile strength of no greater than about 5 percent after 25 washings, and no greater than about 10 percent after about 100 washings.

Despite the strength properties of the articles, the articles also exhibit desirable aesthetics. For example, stiffness or drapeability of the adhesively secured fabric as measured using cantilever stiffness tests is relatively low when compared to conventional adhesive seams.

The present invention will be further illustrated by the following non-limiting examples.

Characteristics and performance of curable hot melt adhesives useful in the present invention were evaluated in the following examples. A description of components and processing conditions used in the examples is set forth in Table 1:

TABLE 1

CHARACTERISTICS OF COMPONENTS USED IN EXAMPLES

FABRIC

| | |
|---|---|
| SPRINGS INDUSTRIES, INC. (style) | Type 10 |
| WEAVE PATTERN | Plain |
| CONSTRUCTION | 104 (warp ends) × (fill picks) |
| BASIS WEIGHT | 3.1 ounces/square yard |
| THICKNESS (ASTM D-1777-64) | 0.010-inch |
| INTERSTITIAL VOIDS | 8.1% of total area |
| TENSILE STRENGTH (pounds) | 60 × 35 (warp × fill) |
| TEAR STRENGTH (pounds) | 26 × 20, (to break warp) × (to break fill) |
| EQUILIBRIUM MOISTURE-REGAIN | 4% by weight |

YARN

| | |
|---|---|
| WARP (size, type) | 37 Murata airjet spun |
| FILL (size, type) | 27 ringspun |
| FIBER BLEND (by weight, all yarns) | 50% polyester/50% cotton |

ADHESIVE

| | |
|---|---|
| TYPE | Moisture-cure polyurethane |
| MANUFACTURER | SWIFT ADHESIVES DIVISION REICHHOLD CHEMICALS, INC. |
| BRAND | EVER-LOCK ™ 2U302 |
| VISCOSITY | 4,500 centipoise @ 250° Fahrenheit |
| SOFTENING POINT | 150° Fahrenheit |
| POT TIME (after melt, before application) | 2 hours |
| OPEN TIME | 35 seconds |
| QUICK TACK | (not quantified) |
| GREEN STRENGTH | 5 pounds (force) to zipper, minimum |
| CURE RATE | 75% in 24 hours |
| ULTIMATE STRENGTH | 35 pounds (force) |

SEAM

| | |
|---|---|
| NOZZLE ORIFICE | 0.018-inch circular-profile bead |
| NOZZLE POSITION | 0.2-inch above fabric surface |
| UNSUPPORTED GLUE-BEAD (time of flight) | 0.1-second, maximum |
| UN-NIPPED GLUE BEAD TRANSPORT | 2 seconds |
| NIP PRESSURE (80 durometer rubber to chrome) | 2 air cylinders (0.75-inch shaft, 2 inch cylinder) |
| NIP-PRESSURE DURATION (tangential) | 0.1-second maximum (applied on bead) |
| APPLICATION TEMPERATURE | 220° Fahrenheit |
| APPLICATION SPEED | 170 feet/minute |
| DELIVERY RATE | 0.3 gram/meter |
| CANTILEVER STIFFNESS (ASTM 1388) | $G_W$ = 7,000 milligram · centimeter |

TEMPERATURE

| | |
|---|---|
| CLOTH | 78° Fahrenheit |
| ROOM | 78° Fahrenheit |
| NIP ROLL | 78° Fahrenheit |

RELATIVE HUMIDITY

| | |
|---|---|
| ADHESIVES PILOT LAB CURE-CYCLE | 20–65% (during application process) |
| CLOTH-STORAGE | 0–65% (head-space air/volume) |

EXAMPLE 1

The performance of curable hot melt adhesives useful in the present invention was compared to that exhibited by conventional thermoplastic hot melt adhesives. A bead of each type of adhesive was applied within a folded hem formed of three contiguous fabric layers. These fabrics comprise intimate blends of natural cotton fibers and synthetic polyester fibers in approximately equivalent weight concentrations.

The stiffness (i.e., flexibility) of each resultant hem was evaluated using cantilever stiffness test method ASTM D-1388-64. Transverse grab shear tensile strength of each hem was evaluated before and after laundering by measuring the tensile force (in pounds) applied across an adhesive seam to separate opposing, diagonal portions of fabrics bonded to one another (force to shear the adhesive seam). Samples are tested using an Instron tester set as described above with regard to transverse grab peel tensile. However, the transversely positioned seam is tested with the force applied in shear mode rather than peel mode. Thus, opposing portions of two adhesively seamed fabrics, each portion extending from the opposite sides of the adhesive seam with the seam running therebetween, are manually separated and the specimen is mounted to orient the adhesive seam with its long or seam dimension transverse to the movement of the jaws and centrally therebetween, so that the test applies force through, rather than across, the seam. Adhesive bond failure modes were also rated for the sheared bonds.

The laundering conditions (Angelica wash for medical barrier fabrics) were as follows. The fabric samples were weighed and enough "dummy" load was added to each sample to bring the sample to a total weight of about 23 pounds. The sample (along with the dummy weight) was placed in a washer and laundered as follows:

ANGELICA WASH FOR MEDICAL BARRIER FABRICS

| OPERATION | WATER LEVEL/ TEMPERATURE (° F.) | TIME (MINUTES) | OPERATION DESCRIPTION |
|---|---|---|---|
| Flush | High/120 | 3 | Wet out fabric. |
| Drain | | 1 | Drain water. |
| Break | High/160 | 10 | Add water and detergent. Wash. |
| Drain | | 1 | Drain water and detergent. |
| Flush | High/160 | 2 | Wet out and rinse. |
| Drain | | 1 | Drain water. |
| Flush | High/160 | 2 | Wet out and rinse. |
| Drain | | 1 | Drain water. |
| Suds | High/140 | 8 | Add about 21 grams detergent and wash. |
| Drain | | 1 | Drain water and detergent. |
| Rinse | High/140 | 5 | Water rinse. |
| Drain | | 1 | Drain water. |
| Cool down | High/100 | | Lower water temperature. |
| Rinse | High/100 | 8 | Water rinse. |
| Drain | | 1 | Drain water. |
| Rinse | High/cold | 3 | Water rinse. |
| Drain | | 1 | Drain water. |
| Sour | High/cold | 5 | Add Klera-cid (Diversey Corp., Wyandotte, MI) and Cotergent (H. H. Coleman Co., Bridgeton, MO). |
| Drain | | 2 | Drain water. |
| Extract | | 0.5 | Washer spins rapidly to extract excess water. |

TABLE 2

ADHESIVE APPLICATION AND SEAM PROPERTIES

TEST, METHODS, & UNITS

| | Adhesive Application | | | Cantilever Stiffness ASTM | Transverse Grab Shear Tensile Strength (Pounds Force) After (x) Washes[3] | | |
|---|---|---|---|---|---|---|---|
| | Temperature | Delivery Rate (direct | Pressure at Nip[2] (pressure | | | | |
| | | | | | x = 0 | | x = 5 |
| SAMPLE[1] | (thermocouple) ° Fahrenheit | measure) gram/meter | gauge) bar | D-1388-64 gram × cm | (original) | (reactivated) | (original) |
| PUR (Invention) | 210 | 0.94 | 0 | 6 | 60 | not measured | 62 |
| PET (Comparative) | 350 | 0.94 | 3 | 8 | 12 | ~20 | 9 |
| PA (Comparative) | 400 | 0.94 | 5 | 7 | 12 | ~20 | 10 |

[1]PUR = reactive moisture-curable polyurethane adhesive.
PET = conventional polyester adhesive.
PA = conventional polyamide adhesive.
[2]Two (each) 0.75-inch shaft, 2-inch air cylinders without counterbalance.
[3]Angelica wash for medical barrier fabrics (method): dryings occurred after each wash.

In Table 2, "PUR" indicates a moisture curable polyurethane adhesive available from Swift Adhesives. This adhesive had a viscosity of 4,500 cP at 250° F. "PET" is a conventional hot melt polyester adhesive, available from Dexter Corporation (Seabrook, N.H.). This adhesive had a viscosity of 100,000 cP at an application temperature of 320° F. "PA" is a conventional hot melt polyamide adhesive, also available from Dexter Corporation. This adhesive had a viscosity of 750,000 cP at an application temperature of 320° F.

The failure mode of the PUR seams was internal cohesive failure of the adhesive. The failure mode of the PET and PA seams was delamination of the adhesive from one of the fabric surfaces in the structure.

The curable polyurethane adhesives resulted in much higher initial bond strength as compared to the conventional hot melt adhesives. The delamination of polyester and polyamide samples indicated that the adhesive was cooling and solidifying without achieving a mechanical bond. The PET and PA samples were reheated at temperatures from 200–400° F. to improve seam strength. Cohesive bonds were achieved by reactivating and nipping the seams; however, the strengths for both seams were about 20 pounds force. Still higher strengths were achieved at higher temperatures, which resulted in saturation of the fabric, i.e., flushing of adhesive through the body of the fabric and marring of the opposite face of the fabric. Further, these improved seam strengths were still well below the 60 pound strengths that were achievable with the curable hot melt adhesive without secondary processing.

This illustrates that the use of moisture cure polyurethanes can eliminate the need for either preheating a fabric or secondary heating a hem to achieve sufficient bond strength. Further, wet out is more easily controlled with the curable adhesives, due to their lower viscosity (4,500 cP) and the fact that they can be chemically compounded to get the desired performance properties. One may, however, "preheat" fabrics, reheat seams, thermally quench seams and use other means to normalize feedstocks entered into this process and to optimize running conditions, speed of operation, and machinery design as may be needed.

In addition, the data demonstrate that the moisture cure polyurethanes have no appreciable strength loss through laundering. Still further, these adhesives exhibit better drape and flexibility, as compared to the conventional hot melt adhesives.

EXAMPLE 2

Transverse grab shear tensile strengths and the resultant failure modes of moisture curable polyurethane adhesive seams were evaluated as follows to evaluate loss of durability due to laundering. Transverse grab shear tensile strength was evaluated using the test method described above. The results are set forth below in Table 3, and illustrate the excellent durability of the adhesive seams of the invention.

TABLE 3

TRANSVERSE GRAB SHEAR TENSILE STRENGTH AND FAILURE MODE* AFTER WASH CYCLES

| | WASH CYCLES** | | | | | | | | | |
|---|---|---|---|---|---|---|---|---|---|---|
| | 0 | | 25 | | 50 | | 75 | | 100 | |
| SAMPLE | STRENGTH (pounds) | MODE | STRENGTH (pounds) | MODE | STRENGTH (pounds) | MODE | STRENGTH (pounds) | MODE | STRENGTH (pounds) | MODE |
| 1 | 55 | E | 56 | D | 52 | D | 50 | D | 51 | D |
| 2 | 61 | D | 57 | D | 56 | D | 55 | A | 48 | D |
| 3 | 58 | D | 55 | D | 52 | A | 46 | A | 51 | D |

TABLE 3-continued

TRANSVERSE GRAB SHEAR TENSILE STRENGTH AND FAILURE MODE* AFTER WASH CYCLES

| | WASH CYCLES** | | | | | | | | | |
|---|---|---|---|---|---|---|---|---|---|---|
| | 0 | | 25 | | 50 | | 75 | | 100 | |
| SAMPLE | STRENGTH (pounds) | MODE | STRENGTH (pounds) | MODE | STRENGTH (pounds) | MODE | STRENGTH (pounds) | MODE | STRENGTH (pounds) | MODE |
| 4 | 55 | D | 53 | D | 55 | D | 54 | D | 47 | A |
| 5 | 56 | A | 56 | D | 55 | A | 48 | A | 54 | D |
| AVERAGE | 57 | | 55 | | 54 | | 51 | | 50 | |

*A = adhesive remained attached to fabric but tore.
D = adhesive bead breaks without seam-slippage (cohesive failure of adhesive).
E = adhesive delaminated from fabric without distorting the fabric.
**Angelica wash for medical barrier fabrics.

The foregoing examples are illustrative of the present invention and are not to be construed as limiting thereof. The invention is defined by the following claims, with equivalents of the claims to be included therein.

That which is claimed:

1. A process for simulated sewing of textile articles, comprising:
    applying molten curable hot melt adhesive at a temperature of about 200° F. to about 250° F. to a surface of a textile substrate along a simulated sewing path, said curable hot melt adhesive having an initial softening point prior to curing and an irreversibly increased softening point relative to said initial softening point after curing;
    applying pressure to the textile substrate to cause adhesive to penetrate into the fibrous structure of the textile substrate; and
    subjecting the adhesive to conditions sufficient for curing the adhesive.

2. The process of claim 1, wherein said process further comprises directing first and second textile substrates into opposing face-to-face relationship prior to said adhesive applying step; and
    wherein said adhesive applying step comprises applying molten curable hot melt adhesive between the overlying substrates.

3. The process of claim 1, wherein said process further comprises contacting molten adhesive with an opposing textile substrate surface so that adhesive is disposed between textile substrate surfaces prior to said pressure applying step.

4. The process of claim 1, wherein said process further comprises folding a longitudinal edge portion of a textile substrate upon itself into overlying substrate layers to define a longitudinal hem along the longitudinal edge of the textile substrate prior to said adhesive applying step; and
    wherein said adhesive applying step comprises applying molten curable hot melt adhesive between the overlying substrate layers.

5. The process of claim 1, wherein said adhesive applying step comprises applying molten curable hot melt adhesive along a longitudinal edge portion of a surface of a textile substrate.

6. The process of claim 1, wherein the curable hot melt adhesive is a moisture curable hot melt adhesive.

7. The process of claim 6, wherein the curable hot melt adhesive is a moisture curable polyurethane hot melt adhesive.

8. The process of claim 6, wherein said subjecting step comprises exposing the adhesive to atmospheric moisture.

9. The process of claim 6, wherein said subjecting step comprises increasing the atmospheric moisture in a region proximate the curable adhesive.

10. The process of claim 9, wherein said atmospheric moisture increasing step comprises introducing steam or mist into a region proximate the adhesive.

11. The process of claim 1, wherein said cured adhesive exhibits thermal reversibility between solid and liquid phases.

12. The process of claim 1, wherein said adhesive in its cured state is substantially heat resistant to temperatures ranging from at least about 10° F. to about 100° F. higher than the softening point of said adhesive in its uncured state.

13. The process of claim 12, wherein said adhesive in its cured state is substantially heat resistant to temperatures of at least about 40° F. higher than the softening point of said adhesive in its uncured state.

14. A process for hemming a fabric, comprising:
    directing a fabric along a predetermined path of travel while directing one longitudinal edge portion of the fabric into and through a folding guide and folding the longitudinal edge portion upon itself into overlying fabric layers to define a longitudinal hem along the longitudinal edge of the fabric;
    applying molten curable hot melt adhesive at a temperature of about 200° F. to about 250° F. between the overlying fabric layers along a simulated sewing path, said curable hot melt adhesive having an initial softening point prior to curing and an irreversibly increased softening point relative to said initial softening point after curing;
    applying pressure to said longitudinal hem to cause molten adhesive to penetrate into the fibrous structure of the fabric layers and to adhere the fabric layers to one another; and
    subjecting the adhesive to conditions sufficient for curing the adhesive.

15. The process of claim 14, further comprising reheating the curable hot melt adhesive and realigning the overlying fabric layers prior to said subjecting step.

16. The process of claim 14, wherein said adhesive applying step comprises extruding the adhesive.

17. The process of claim 16, wherein said adhesive applying step comprises extruding a continuous bead of adhesive along the simulated sewing path.

18. The process of claim 14, wherein the curable hot melt adhesive is a moisture curable hot melt adhesive.

19. The process of claim 18, wherein the curable hot melt adhesive is a moisture curable polyurethane hot melt adhesive.

20. The process of claim 18, wherein said subjecting step comprises exposing the adhesive to atmospheric moisture.

21. The process of claim 18, wherein said subjecting step comprises increasing the atmospheric moisture in a region proximate the curable adhesive.

22. The process of claim 21, wherein said atmospheric moisture increasing step comprises introducing steam or mist to a region proximate the curable hot melt adhesive.

23. A process for forming a selvage, comprising:
    applying molten curable hot melt adhesive at a temperature of about 200° F. to about 250° F. to an edge portion of a surface of a textile substrate along a simulated sewing path, said curable hot melt adhesive having an initial softening point prior to curing and an irreversibly increased softening point relative to said initial softening point after curing; and
    subjecting the adhesive to conditions sufficient for curing the adhesive.

24. The process of claim 23, further comprising applying pressure to the substrate to cause adhesive to penetrate into the fibrous structure of the textile substrate after said adhesive applying step.

25. The process of claim 23, wherein the curable hot melt adhesive is a moisture curable hot melt adhesive.

26. The process of claim 25, wherein the curable hot melt adhesive is a moisture curable polyurethane hot melt adhesive.

27. The process of claim 25, wherein said subjecting step comprises exposing the adhesive to atmospheric moisture.

28. The process of claim 25, wherein said subjecting step comprises increasing the atmospheric moisture in a region proximate the curable hot melt adhesive.

29. The process of claim 28, wherein said atmospheric moisture increasing step comprises introducing steam or mist to a region proximate the curable hot melt adhesive.

30. A process for making textile articles, comprising:
    directing first and second textile substrates into opposing face-to-face relationship;
    applying molten curable hot melt adhesive at a temperature of about 200° F. to about 250° F. between the overlying substrates along a simulated sewing path so that adhesive is disposed between the substrates, said curable hot melt adhesive having an initial softening point prior to curing and an irreversibly increased softening point relative to said initial softening point after curing;
    applying pressure to the textile substrates to cause adhesive to penetrate into the fibrous structure of the textile substrate; and
    subjecting the adhesive to conditions sufficient for curing the adhesive.

31. A process for making textile articles, comprising:
    applying molten curable hot melt adhesive at a temperature of about 200° F. to about 250° F. along a simulated sowing path on a surface of a textile substrate, said curable hot melt adhesive having an initial softening point prior to curing and an irreversibly increased softening point relative to said initial softening point after curing;
    contacting the molten adhesive with an opposing textile substrate surface so that adhesive is disposed between textile substrate surfaces;
    applying pressure to the textile article to cause adhesive to penetrate into the fibrous structure of the textile substrate; and
    subjecting the adhesive to conditions sufficient for curing the adhesive.

32. A process for making textile articles, comprising:
    applying molten curable hot melt adhesive at a temperature of about 200° F. to about 250° F. along a simulated sewing path on a surface of a textile substrate, said curable hot melt adhesive having an initial softening point prior to curing and an irreversibly increased softening point relative to said initial softening point after curing;
    thermally quenching the molten curable hot melt adhesive to its initial non-tacky, solid phase;
    configuring the textile substrate prior to substantial cure of said adhesive so that the non-tacky adhesive is disposed between opposed surfaces of the textile substrate;
    heating said curable hot melt adhesive mid applying pressure to the textile substrate surface to cause adhesive to penetrate into the fibrous structure of the opposed surfaces of the substrate; and
    subjecting the adhesive to conditions sufficient for curing the adhesive.

33. The process of claim 32, wherein said configuring step comprises positioning the substrate to form a textile article comprising multiple points of juxtaposed contacting surfaces with non-tacky adhesive disposed therebetween.

34. A process for providing decorative patterns to textile articles, comprising:
    applying a pattern of molten curable hot melt adhesive at a temperature of about 200° F. to about 250° F., said curable hot melt adhesive having an initial softening point prior to curing and an irreversibly increased softening point relative to said initial softening point after curing on a surface of a textile substrate along a simulated sewing path; and
    subjecting the adhesive to conditions sufficient for curing the adhesive.

35. The process of claim 34, further comprising contacting at least a portion of the curable hot melt adhesive with another substrate prior to applying the adhesive.

36. The process of claim 35, wherein said another substrate is selected from the group consisting of ribbons, beads, and braiding.

37. A process for providing a decorative edge affect to textile articles, comprising:
    applying a shaped deposit of curable hot melt adhesive at a temperature of about 200° F. to about 250° F. to an edge of a textile substrate, said curable hot melt adhesive having an initial softening point prior to curing and an irreversibly increased softening point relative to said initial softening point after curing; and
    subjecting the adhesive to conditions sufficient for curing the adhesive.

* * * * *

UNITED STATES PATENT AND TRADEMARK OFFICE
CERTIFICATE OF CORRECTION

PATENT NO. : 6,579,403 B2
DATED : June 17, 2003
INVENTOR(S) : Tolbert et al.

It is certified that error appears in the above-identified patent and that said Letters Patent is hereby corrected as shown below:

Title page,
Item [56], References Cited, OTHER PUBLICATIONS, 2nd and 3rd cited references, "Adhesive" should read -- Adhesives --.

Column 15, Table 1,
Line 9, before "(fill picks)" insert -- 44 --.

Column 21,
Line 56, "sowing" should read -- sewing --.

Column 22,
Line 23, "mid" should read -- and --.

Signed and Sealed this

Seventh Day of October, 2003

JAMES E. ROGAN
*Director of the United States Patent and Trademark Office*